Feb. 22, 1955     H. PETERS ET AL     2,702,429
METHOD OF MAKING TUBULAR PINS
Original Filed July 30, 1948     6 Sheets-Sheet 1

Inventors
HOWARD PETERS
EDWARD J. HAEDIKE

Inventors
Howard Peters
Edward J. Haedike

United States Patent Office 2,702,429
Patented Feb. 22, 1955

2,702,429

METHOD OF MAKING TUBULAR PINS

Howard Peters, Springfield, N. J., and Edward J. Haedike, Chicago, Ill., assignors, by mesne assignments, to Elastic Stop Nut Corporation of America, Union, N. J., a corporation of New Jersey Original application July 30, 1948, Serial No. 41,633, now Patent No. 2,582,062, dated January 8, 1952. Divided and this application September 9, 1950, Serial No. 184,082

5 Claims. (Cl. 29—534)

This invention relates to the production of tubular metal pins having a slot or gap along their length and generally referred to as tubular pins. More particularly, the invention deals with a method for accurately forming tubular pins of any desired length from spring steel stock. This application is a division of our co-pending application Serial No. 41,633, filed July 30, 1948, now Patent No. 2,582,062 issued January 8, 1952.

While it has been recognized that spring steel tubular pins are highly desirable fasteners and connectors in the mechanical arts and are especially effective as keys, bearing pins, dowel pins, clevis pins, and the like because of their light weight, strength, lubricant-conveying capacity and ability to adapt themselves to various tolerance dimensions, it has not heretofore been possible to accurately produce suitable tubular pins on an economic commercial scale. Prior attempts to produce tubular pins have included the cutting of tubes into the desired lengths and the longitudinal milling of slots along the length of the cut tubes, as well as punch press deformation of stamped out blanks. These procedures have required finishing operations and successive handling which render the prior practices too slow and costly to compete with the production of solid pins and keys.

According to the present invention, tubular pins are accurately formed from spring steel strip stock. The steel strip preferably has the metal grain thereof extending parallel with the length of the strip and preferably has beveled or chamfered side edges. Slugs are cut from the strip. The width of the strip determines the length of the tubular pin, and the length of the cut-off slug determines the circumference of the tubular pin. Thus, the grain of the metal extends around the circumference of the pin to increase the strength and wearing capacity of the pin, since the only pin surface defined by the grain band ends will be the edges of the pin defining the slot or gap. The ends of the pin are defined by the chamfered or beveled sides of the strip and thus have tapered contours to facilitate insertion of the pin in a hole. The machine for producing the pin includes a cutter and feeder for cutting the slugs from the strip and for feeding these slugs in end to end relation to a series of forming rollers. These forming rollers are composed of mating pairs of rollers with peripheral contours that are so shaped as to form nips which will successively curl the slugs to the desired tubular pin dimension.

An important feature of this invention resides in the initial bending of the side margins of the slugs to the shape they will have in the final tubular pin, then successively deforming the resulting blank inwardly from the bent sides to form a C-shaped blank and then squeezing the C-blank into tubular form while holding the side edges of the blank in controlled spaced opposed relation.

Another object of the invention is to provide an economical process for commercially producing accurate tubular pins from flat metal slugs that can be conveniently cut from metal strip stock.

A specific object of the invention is to provide a method of successively forming an initially flat metal slug between sets of forming rolls having cooperating contours which curl the metal to the desired tube pin diameter and hold the gap of the tubular pin to a predetermined dimension.

Another object of the invention is to provide a process for producing tubular pins such as spring dowel pins by cutting a metal strip having a width desired for the length of the metal pin into blanks having a cut-off length gauged in accordance with the desired dimension for the circumference of the pin.

Another object of the invention is to provide a method for making tubular pins with controlled cleft gaps by successively bowing a metal slug to provide a channel blank, a C-shaped blank, and finally a tubular blank having a gap along its length.

Other and further objects of the invention will be apparent to those skilled in the art from the following detailed description of the annexed sheets of drawings, which, by way of a preferred example illustrate a machine for carrying out the process of this invention together with the tubular pins produced by the process of this invention.

Figures 1, 2, 3:
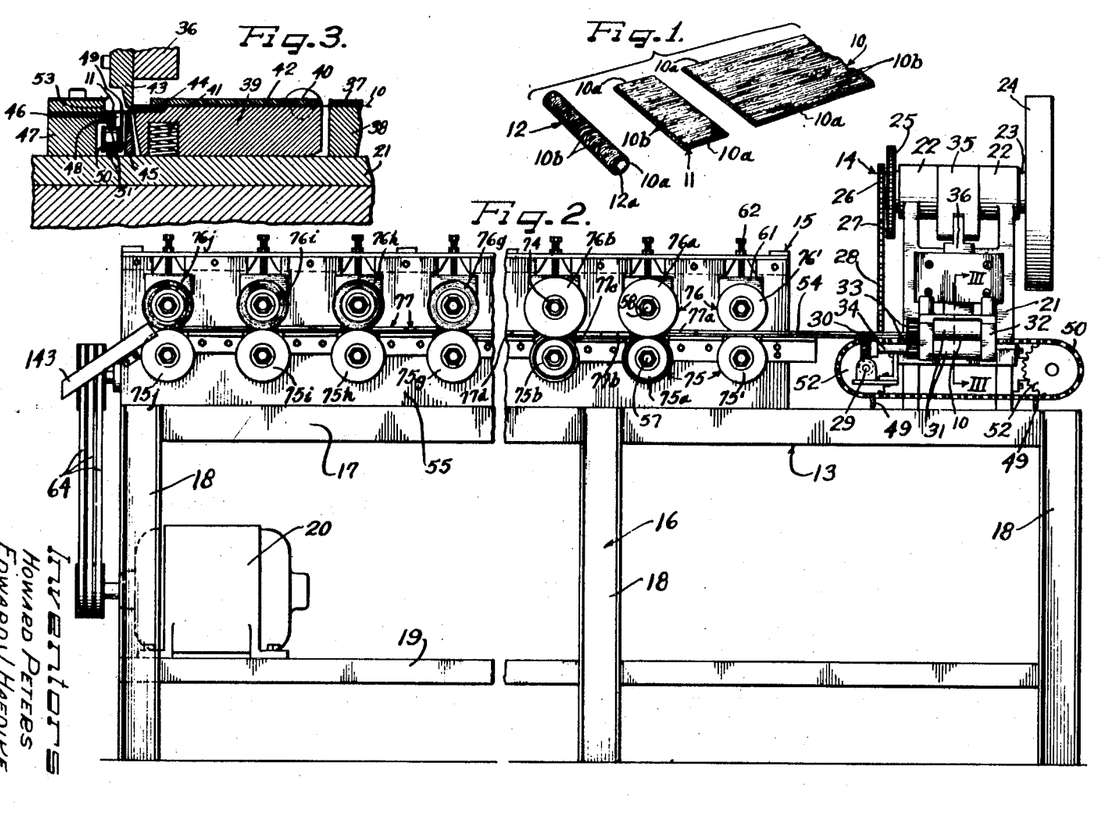
Figure 1 is a group of isometric views illustrating strip stock for forming the tubular pins of the invention, a flat slug cut from the strip stock, and a finished tubular pin produced from the slug.
Figure 2 is a broken, side elevational view of the tubular pin forming machine including the cutting and feeding mechanism and the roll mill.
Figure 3 is a fragmentary transverse cross-sectional view taken substantially along the line III—III of Figure 2 and illustrating the cutting of the metal strip stock into slugs and the feeding of the slugs to the roll mill portion of the machine.

In Figure 1, the reference numeral 10 designates a strip of spring steel from which the tubular pins of this invention are formed. The spring steel is preferably a steel containing .092 to 0.10% carbon, such as S. A. E. 1095. Such steel, after being formed into the tubular pins, can be heat-treated in salt baths to develop suitable Rockwell hardnesses of about 52 C. The strip 10 is chamfered or beveled along the sides thereof to provide tapered walls 10a converging toward one face of the strip. The grain of the metal extends longitudinally along the length of the strip as illustrated at 10b so that the beveled sides 10a are defined by the sides of the grain bands, and the ends of the grain bands are only exposed at the leading edge of the strip.

Slugs 11 are cut from the leading edge of the strip 10 and, of course, have beveled ends 10a and the grain band configuration 10b of the strip. The length of the leading end portion which is cut to form the slug 11 determines the circumferential dimension of the tubular pin since the slug is curled in the direction of the grain 10b to form the tubular pin 12. As illustrated, the grain bands 10b extend around the circumference of the tubular pin and the beveled sides 10a of the slug form tapered ends 10a on the tubular pin with the taper converging toward the inside diameter of the tubular pin to form reduced diameter tapered end portions on the tubular pin facilitating insertion of the tubular pin in a hole or keyway. The pin 12 has a slot or gap 12a of controlled uniform width along its entire length.

The tubular pins are thus formed from flat spring steel strip stock by cutting off successive leading end portions of the strip to form slugs having a length determined by the width of the strip to control the length of the tubular pin and having a width determined by the length of the cut-off section to control the circumferential dimension of the tubular pin. Very short tubular pins are formed as accurately as longer pins.

The machine 13 for making the tubular pins 12 from the strip stock 10 includes, as shown in Figure 2, a cutter and feeder mechanism 14 and a roll mill assembly 15 mounted on a frame 16 having a horizontal top 17 supporting the sub-frames of the assemblies 14 and 15. The frame 16 includes legs or uprights 18 carrying the top 17 and preferably also supporting a shelf 19 in spaced relation under the top 17 to rigidify the legs and to carry a prime mover such as an electric motor 20.

The cutting and feeding assembly 14 includes an upstanding frame 21 mounted on the top 17 of the main frame 16 and equipped with bearing supports 22 at its upper end. These bearing supports 22 are in spaced relation and receive a shaft 23 therethrough and through the space therebetween. A flywheel 24 is secured on one end of the shaft 23, and sprockets 25 and 26 are secured on the other end of the shaft 23. The sprocket 25 is driven through a chain 27 by an electric motor (not shown). The sprocket 26 drives a chain 28 which actuates a worm shaft 29 to drive a worm wheel 30.

A pair of feed rollers 31 are rotatably mounted in bearings 32 provided on the frame 21 and receive the strip 10 therebetween. The rollers are preferably geared together by gears 33 and an axle shaft 34 on the lower roller 31 carries the worm gear 30 so that power for rotating the feed rollers is imparted from the driving motor through the chain 28 and worm shaft 29.

An eccentric 35 is mounted on the shaft 23 between the bearings 22, and a shear block 36 slidably mounted in the frame 21 is pinned to this eccentric to be raised and lowered thereby as the shaft 23 is rotated.

As best shown in Figure 3, the metal strip 10 from the feed rollers 31 is fed through a slot 37 in a covered block 38 to a feed table 39 which is rockably mounted on the frame 21 to pivot about a pin 40. A spring 41 acts upwardly on the feed table 39 to raise the discharge end of the table. A groove 42 extends through the table to receive the stock 10 from the groove 37. The leading end of the table lies adjacent a cutter knife 43 carried by the shear block 36 and has an insert 44 of tool steel or the like hard material to form a cutting edge for cooperation with the cutter 43. The strip 10 is fed over the top of the insert 44, and the cover forming the top wall of the groove 42 terminates in spaced relation from the cutter 43 to expose a portion of the top of the insert 44.

An upstanding rib 45 is provided on the frame 21 in front of the rocking table 39 to provide a support for slugs 11 cut from the stock 10. This rib cooperates with a plate 46 on a block 47 to form a track or guide for the slugs 11 and a slot 48 is provided between the plate and rib to receive upstanding ejector fingers 49 on a chain 50 which has an upper run guided between spaced opposed lugs 51.

As shown in Figure 2, the chain 50 is trained around sprockets 52, and one of the sprockets 52 is driven from the worm shaft 29 so that the ejector fingers 49 will pass through the slot 48 and successively strike against the cut-off slugs 11 and eject the same out of the cutter.

As shown in Figure 3, the spring 41 tilts the table 39 upwardly so that the leading end of the strip 10 will abut the cutter 43 to stop further forward movement of the strip. The feed rollers 31 can be continually driven, but since the length of the strip between the feed rollers and the cutter 43 is confined in the grooves 37 and 42, the strip cannot buckle when its forward movement is stopped by the cutter 43 and the rolls will merely slip on the strip until the cutter is raised above the leading end thereof, whereupon the feed rollers will advance the leading end of the strip to the abutment plate 53. This plate 53 is adjustably mounted on the block 47 to control the distance between the cutting edge of the insert 44 and the abutment edge, thereby controlling the width of the slug 11 as desired.

When the eccentric 35 moves the shear bar 36 downwardly, the cutter 43 acts on the top of the strip 10 and cooperates with the insert 44 to shear off the slug 11. The slug 11 immediately drops on top of the rib 45 and plate 46 into the path of the ejector fingers 49 which discharge the slug. Forward movement of the strip 10 is arrested until the cutter 43 is raised by the eccentric 35 above the leading edge of the strip. The spring 41 is effective to raise the leading edge of the strip above the cutting edge of the cutter as soon as the slug 11 is severed from this leading edge, so that the strip will not be advanced by the feed rollers 31 until the cut-off slug is ejected and the cutter has been raised on the next stroke thereof.

The assembly 14 thus receives the strip 10, cuts the slugs 11 from the leading edge of the strip, and ejects these slugs in end to end relation at right angles to the strip. The slugs are received in a guide track 54 (Figure 2) bridging the space between the slotted track afforded by the rib 45 and plate 46 and the roll mill assembly 15. This roll mill assembly includes upstanding front and rear walls 55 and 56 in spaced parallel relation mounted on the table 17.

Figure 4:
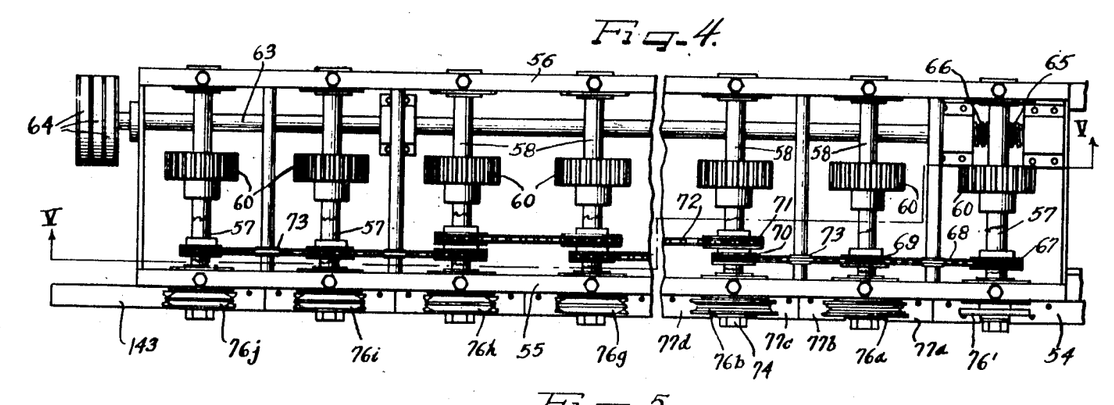
Figure 4 is a broken top plan view of the roll mill portion of the machine.
Figure 5:
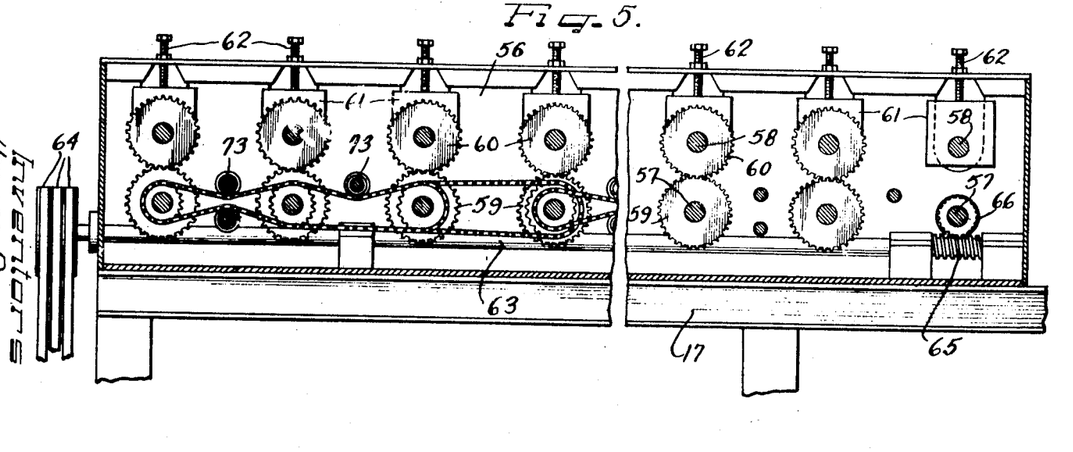
Figure 5 is a longitudinal cross-sectional view, with parts in front end elevation, taken substantially along the line V—V of Figure 4.

As shown in Figures 2, 4 and 5, a plurality of lower shafts 57 and a plurality of upper shafts 58 bridge the space between the walls 55 and 56 and extend through the front wall 55. The shafts 57 and 58 are arranged in pairs with each pair being geared together by gears 59 and 60. Bearings for both ends of the top shafts 58 are mounted in slide blocks 61 in the front and rear walls so that the levels of these shafts are controlled with adjusting screws 62 for adjusting the top forming wheels relative to bottom wheels carried by the bottom shafts 57 which are mounted in fixed bearings in the walls 55 and 56.

A longitudinal drive shaft 63, as best shown in Figures 4 and 5, is rotatably mounted in bearings between the walls 55 and 56 at a level below the bottom shafts 57. This drive shaft 63 is driven through belts 64 from the motor 20, as shown in Figure 1. A worm 65 is provided on the shaft 63 to drive a gear 66 on the first bottom shaft 57 of the roll mill assembly. This first shaft 57 has a sprocket 67 thereon immediately behind the front wall 55, and the sprocket 67 drives a chain 68 which is meshed with a sprocket 69 on the second lower shaft 57 and a sprocket 70 on the third lower shaft 57. Thus, the first three shafts 57 are connected by the same chain 68. The third shaft 57 containing the sprocket 70 also carries a sprocket 71 which drives a chain 72, and this chain in turn drives the next two bottom shafts (not shown). Additional chains and sprockets on the successive lower shafts 57 likewise transfer the driving power to all of the shafts. The size of the sprockets will determine the speed of rotation of the shafts, and as will be hereinafter more fully explained, the relative speeds of the shafts are so correlated as to prevent the possibility of jamming of the slugs as they are successively fed through the various passes provided by the nips of the forming wheels. Idler sprockets 73, shown in Figure 5, can be mounted on shafts journaled in the front wall 55 to hold the chains in desired taut condition.

In the illustrated machine, each chain connects three adjacent bottom shafts 57 and the speeds of successive shafts are increased by decreasing the number of teeth on the sprocket carried by the shaft. Thus, the first chain 68 is driven by the sprocket 67 which has more teeth than the sprocket 69 on the second shaft, and this sprocket 69 in turn has more teeth than the sprocket 70 on the third shaft. As a result, the shafts will be driven at ascending rates of speed. The sprocket 71 preferably has the same number of teeth as the sprocket 67 so that the chain 72 actuated by the third shaft 57 will be driven at a somewhat higher speed than the chain 68, and the two sprockets driven by this chain will have less teeth than the sprocket 71 so that their shafts will be driven at faster rates of speed. In the illustrated machine, therefore, the chains each drive groups of three shafts and the succeeding shafts in each group are driven at increased rates of speed. Likewise, the successive groups of shafts are driven at increased rates of speed. The net result is to increase the rate of speed successively from the first to the last bottom shaft.

The rolls or wheels are detachably mounted on the front ends of the shafts 57 and 58 in front of the front wall 55, and, as illustrated, nuts 74 can conveniently be threaded onto the front ends of the shafts for holding the forming rolls thereon. The lower shafts carry rolls or wheels designated generally by the reference numeral 75, while the upper shafts carry mating rolls or wheels designated by the reference numeral 76. All of these mating pairs of rolls or wheels except the first pair (designated 75′ and 76′) are male and female rolls or wheels with mating contoured peripheries acting on the slugs and blanks as they pass through the nips defined by the pairs of rolls. The first pair of wheels 75′ and 76′ are feeders acting on the slugs in the track 54 to advance these slugs to the first forming pass of the wall provided by the first pair of contoured male and female wheels 75a and 76a. The track 54 extends through the nip of the feeder wheels 75′ and 76′ and is slotted in the nip area of the wheels to allow the wheels to engage the slugs 11 in the track.

In order to properly guide and hold the slugs and blanks as they pass through and between the passes or nips of the pairs of contoured forming wheels, the front wall 55 carries in the line of the track 54, a series of guide plates or fingers generally designated by the reference numeral 77. These fingers each have different contours as will be hereinafter explained and are mounted in end to end relation on brackets carried by the front wall 55.

Figure 6:
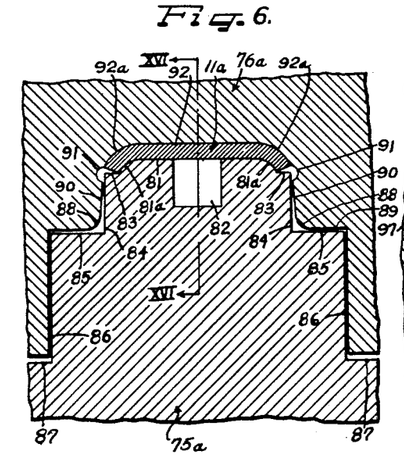
Figures 6 to 15, inclusive, are enlarged, fragmentary cross-sectional views through the nips of the successive pairs of forming rolls in the roll mill section of the machine and illustrating ten passes for the machine.
Figure 18:
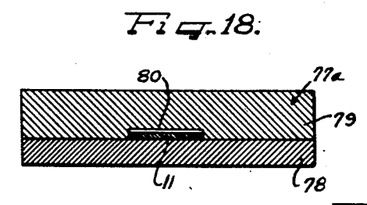
Figures 18 and 19 are transverse cross-sectional views taken along the lines XVIII—XVIII and XIX—XIX of Figure 16.

As best illustrated in Figures 1, 6, 16, 18 and 19, a slug 11 advanced by the feeder wheels 75′ and 76′ is received from the guide track 54 into the first guide finger 77a. This guide finger 77a is composed of a flat bottom plate 78 and a grooved top plate 79 having a groove 80 in its bottom face deeper than the thickness of the slugs 11 received therein and having a width such as to slidably guide the slugs in end-to-end relation. Thus, as illustrated in Figure 18, the width of the groove 80 is only slightly greater than the width of the slug 11 but has a depth about one and one-half times the thickness dimension of the slugs, so that the slugs cannot cock or overlap as they are advanced along the groove. The first guide finger 77a extends from the feeder track 54 into the nip of the first pair of forming wheels composed of the bottom male wheel 75a and the top female wheel 76a. As best shown in Figure 6, the male wheel 75a has a contoured periphery including a flat outer peripheral mandrel wall 81 with a central groove 82 therein. The wall 81 has rounded ends 81a dimensioned to form the final shape for the side margins of the slugs. These ends extend to flat shoulders 83. The shoulders 83 extend axially outward to flat radial walls 84. The walls 84 extend radially inward to axially outward extending flat shoulders 85, and these shoulders 85 in turn extend axially outward to radial walls 86. The walls 86 in turn extend inward to a third pair of axial shoulders 87. Thus, the first male forming roll 75a has a stepped peripheral contour terminating in a flat circumferential mandrel wall 81 which has rounded sides 81a and a central peripheral recess formed by the groove 82. The wall 81 and its ends 81a, as will hereinafter be explained, constitute the mandrel for forming the sides of the slugs into the shapes that they will have in the final roll pin.

As also shown in Figure 6, the first female forming wheel 76a has a contoured periphery with stepped shoulders and side walls forming a complementary recess for the stepped contour of the male roll 75a. However, the complementary recess deviates in some respects from the exact shape of the periphery of the male roll in order to accommodate the slug and to prevent binding. Thus, as shown in Figure 6, the recess in the female roll 76a has a rounded corner 88 between the flat shoulder 89 which complements the shoulder 85 of the male roll, and this rounded corner merges into a slightly converging side wall 90 facing the radial wall 84 of the male member. This rounded corner 88 and sloping side wall 90 provide the first zone for initially receiving the slug 11 as it enters the nip between the first pair of forming rolls, and the contours are designed to smoothly guide the sides of the slug toward the bottom of the recess. The converging or tilted walls 90 should have an angle greater than 3° and less than 45° from the radial or vertical plane of the wheels. The walls 90 converge to semicircular grooves 91 which are opposite the shoulders 83 of the male member. These grooves provide clearance zones, since during the initial deformation of the flat slugs 11, they become appreciably wider and a clearance must be provided to permit their edges to swing through an arc as these edges are turned to form the first blank or slug piece 11a which has a channel shape with a flat web and arcuately curved side flanges.

The bottom of the recess in the female roll 76a is flat as at 92 to complement the wall 81 of the male member. The walls 81 and 92 are spaced apart in the center of the nip for a distance which is equivalent to the thickness of the slug. The wall 92, like the wall 81, has rounded ends 92a complementing the ends 81a.

Figures 16, 17:
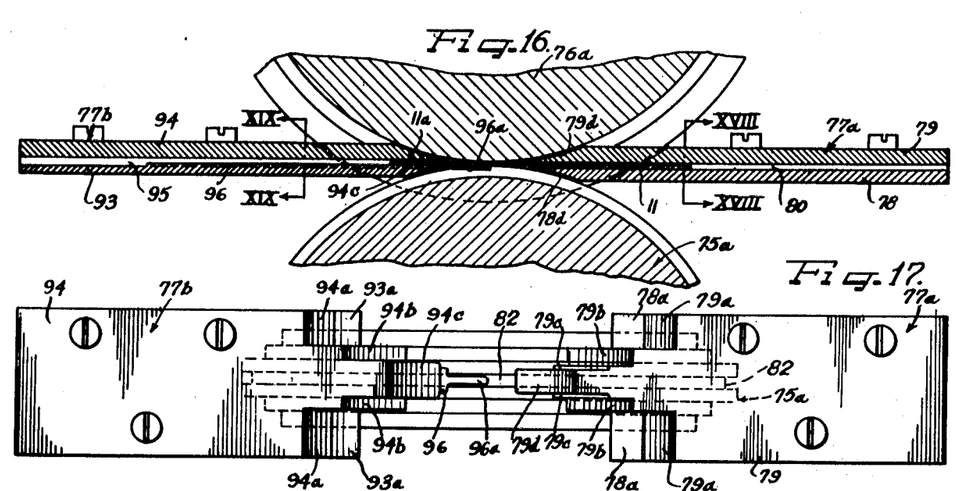
Figure 16 is an enlarged fragmentary longitudinal cross-sectional view taken through the nip area of the first set of forming rolls along the line XVI—XVI of Figure 6 and also illustrating the inlet and outlet guide fingers for the slug and partially formed tubular pin.
Figure 17 is a top plan view of the lower forming roll and the guide members shown in Figure 16.

As illustrated in Figures 16 and 17, and as pointed out hereinabove, since the slugs 11 are relatively short, they must be guided and held as they are acted upon by the forming wheels so that they will not be curved along their length in conformity with the periphery of the wheels. For this purpose, the guide fingers are so arranged as to extend deep into the nips of the various passes. Thus, the first guide finger 77a has the top plate 79 thereof milled at 79a into conformity with the contour of the top wheel 76a to relieve the plate so that it will not strike against the wheels. The bottom plate 78 is similarly milled at 78a. The milled cuts 78a and 79a extend inwardly to an unmilled central portion which can fit into the recess of the female roll under the shoulder 89 thereof. This central portion then extends forwardly into the nip and must be further reduced in width by milled portions 79b which permit clearance between the wall portions 90. The milled portions 79b have deeper milled inner ends 79c to accommodate the taper of the wall 90 as the central portion of the finger projects further into the nip. The inner end of the finger is milled at 79d to follow the contour of the recess wall 92 as it enters the nip. It should be understood, of course, that the bottom face of the bottom plate 78 is similarly milled so that it eventually terminates in a reduced milled finger portion 78d beneath the portions 79d.

As explained hereinabove, the recess or slot 80 in the finger 77a is deeper than the slug 11 by a dimension which is less than the thickness of the slug so that it is impossible for the slugs to overlap. However, the deep recess does permit raising of the slugs as they pass into the nip as illustrated in Figure 16.

As explained above, it is important that the slugs be held against deformation along their length in order that straight tubular pins may be insured. The guide fingers on the inlet sides of the nips thus direct the slugs into the nips at a low level where they can be received into the wider portion of the recess in the female roll, and as the male roll forces the leading end of each slug into its deformed shape and thus moves it deeper into the recess of the female roll, the slug rises to a higher level while still being retained in the groove 80. This is permitted by the clearance above the slug afforded by the deep groove. At the same time, however, the fingers hold the slug in a flat condition and prevent it from being cocked or twisted out of its axial position.

Figure 19:
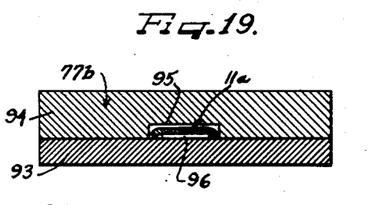

As indicated in Figure 6, the first pass between the wheels 75a and 76a deforms the flat slug 11 to form the first blank 11a. This blank 11a has a flat main web portion with downturned rounded ends. Since the slug, as explained above, enters the nip between the wheels at one level and is forced up into the female roll to a higher level, the deformed slug or blank 11a is ejected out of the nip at this higher level as illustrated in Figure 16. In order to hold the first blank 11a against further deformation, a second set of guide fingers 77b is provided. This set of guide fingers 77b includes a bottom plate 93 and a grooved top plate 94 shown in Figures 16, 17 and 19. The top plate 94 has a groove 95 in its bottom face covered by the bottom plate 93 and sized to accommodate the passage of the blank 11a therethrough. The plates 93 and 94 are milled similar to the plates 78 and 79 so as to clear the stepped shoulders of the forming wheels and to project deeply into the nips. Since the finger 77b is at a higher level than the finger 77a, the contour of the milling will be somewhat different, but it does include the milled outer forward corners 94a of the top plate and 93a of the bottom plate which terminate in the relatively sharp edge to fit close to the shoulders 89 of the wheels 76a and provide a portion of reduced width which extends between the walls 90 and is milled at 94b to extend to a still further reduced portion which is milled at 94c so that it can penetrate deep into the innermost portion of the recess in the female wheel. In addition, however, the guide finger 77b has a raised rib 96 on the bottom plate 93 extending into the central portion of the groove 95 as best shown in Figure 19, so that the rounded edges of the blank 11a can fit around the rib 96. The rib 96 projects beyond the end of the finger 77b into the groove 82 in the wheel 75a, and this projecting tongue portion 96a receives the slug in the nip before the slug leaves the groove 80 to prevent the slug from following the contour of the roll 75a.

As illustrated in Figure 16, the leading end of the slug being deformed in the nip is raised by the male wheel 75a into the recess of the female wheel 76a, thereby moving the slug from the bottom to the top of the groove 80 and the tongue 96a thereupon immediately receives the leading end of the slug to guide it into the groove 95 of the finger 77b. Since the tongue and rib are of less width than the space between the downturned portions of the blank 11a, the blank will be centered on the rib as it advances through the groove 95.

Figure 7:
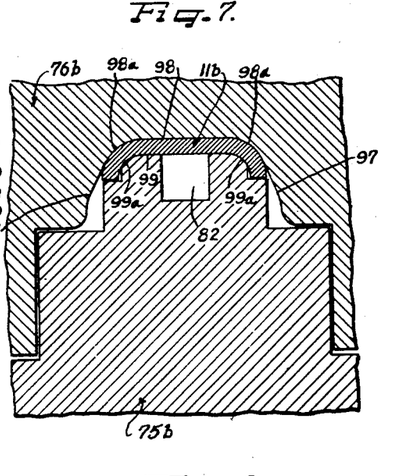

The blanks 11a are advanced in succession by the rotating wheels 75a and 76a through the groove 95 to the next finger 77c (Figures 4 and 5) which guides the blanks into the nip of the second pair of wheels 75b and 76b shown in Figure 7. These wheels are relieved and contoured to work only on increments of the blank 11a which are adjacent the curved side margins formed by the first pair of rolls to form a blank 11b as shown in Figure 7. Thus, the blank 11a is initially fed by the finger 77c between the converging walls 97 of the female wheel 76b which will not deform the downturned ends of the blank and is forced to the bottom of the recess against the flat bottom wall 98 by the mandrel surface 99 on the male wheel 75b. The bottom of the recess has curved ends 98a inwardly from the downturned ends of the blank 11a to extend the curvature inwardly into the flat web or wall of the blank. The mandrel portion 99 of the male wheel 75b has complementary curved portions 99a. As a result, the blank 11b is formed from the blank 11a and has a channel shape with a narrower flat web and with deeper curved side flanges than the blank 11a to continue the circular deformation of the blank. The male wheel 75b has the same recess 82 as the wheel 75a, and the next finger 77d has a tongue end of a guide rib projecting in this recess to receive the blank 11b from the nips of the wheels.

The blank progresses through and is deformed by the second set of wheels in substantially the same manner as illustrated in Figures 16 and 17 to extend the degree of deformation of the sides of the blank while maintaining the central portion of the blank in a substantially flat condition.

The third, fourth, fifth and sixth passes afforded by the rolls shown in Figures 8 to 11 are not included in Figures 4 and 5, but it will be understood that these passes as illustrated in Figures 8 to 11 are for the purpose of bowing the web portion of the blank into a more circular form and that the guide fingers feed the blanks to these rolls at one level and remove the further deformed blanks from the nips of these rolls at a higher level in the same manner described in connection with the previous passes, except, of course, that the tongues projecting into the groove 82 of the first two passes are eliminated.

Figure 8:
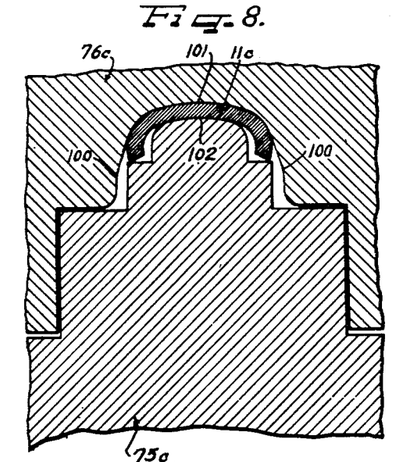

The third set of rolls, designated as the male roll 75c and the female roll 76c, and shown in Figure 8, are contoured to form a blank 11c from the blank 11b, wherein the flat wall of the blank 11b is partially curved. The blank 11b is fed by the next finger 77 between the converging side walls 100 of the female roll 76c and is forced by the male roll into the bottom of the recess against the arcuate bottom wall 101 thereof by the arcuate peripheral rib 102 on the male roll. As shown in Figure 8, the downturned ends of the blank are caused to curl inwardly by deformation of the flat web of the blank 11b into the bowed web of the blank 11c.

Figure 20:
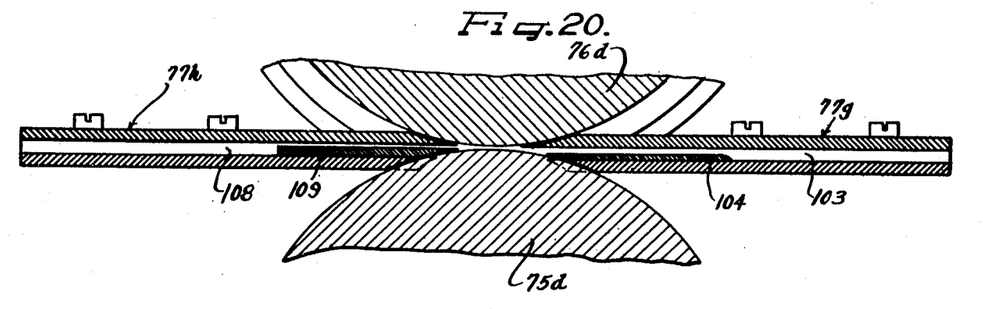
Figure 20 is a cross-sectional view similar to Figure 16 but taken through the forming rolls of Figure 9 along the line XX—XX thereof.

As shown in Figure 20, the illustrated guide fingers 77g and 77h cooperating with wheels 75d and 76d, respectively, project into the incoming and outgoing sides of the nips between the rolls and are representative of the type of guide fingers used in the passes illustrated in Figures 8 to 11 wherein the web or back portion of the blank 11b from the pass shown in Figure 7 is successively deformed to form C-shaped blanks 11c, 11d, 11e and 11f with each successive blank having a more bowed or curved contour and a smaller gap between the sides thereof.

Figure 9:
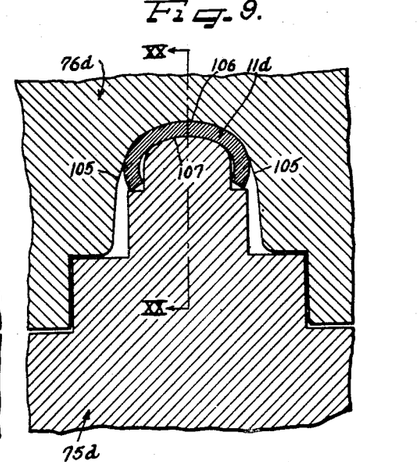

The newly formed blank 11c from the pass illustrated in Figure 8 is fed into the groove 103 of the guide finger 77g shown in Figure 20 where it is advanced in straddling relation on the rib 104 in the groove into the nip between the rolls 75d and 76d between the converging side walls 105 of the recess in the roll 76d as shown in Figure 9 to be forced into the bottom of the recess against the wall 106 thereof by the rounded wall 107 on the periphery of the male wheel 75d, thus raising the blank to a higher level in the nip and forming the blank 11d. The blank 11d is then received in the groove 108 of the guide fingers 77h (Figure 20) in straddling relation around the rib 109 in the leading end of this groove. The rib 109 projects into the nip as far as possible while maintaining clearance relationship with the walls and the wheels.

The ribs 104 and 109 prevent rotation of the blanks in the grooves to insure the presentation of a series of properly aligned blanks to the next pass of the machine.

Figure 10:
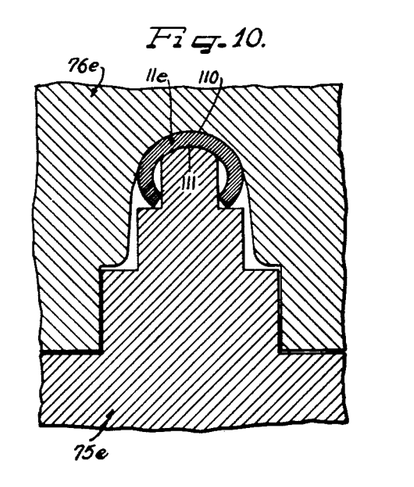

The blank 11d is deformed in the next pass of the machines by the wheels 75e and 76e. Thus, the female wheel has a very pronounced curvature in its bottom wall 110 and the periphery of the male wheel 75e has a complementary curvature 111 to further bow the web or back portion of the blank.

Figure 11:
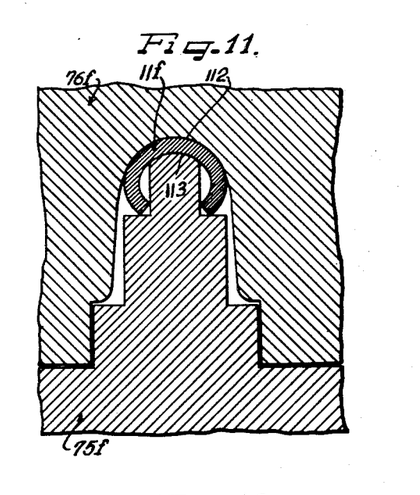

The next pass of the machine shown in Figure 11 includes a substantially segmental circular bottom wall 112 in the recess of the female wheel 76f complemented by a similar curved wall 113 on the periphery of the male wheel 75f to produce the blank 11f which is of substantially circular configuration but has a large gap between the edges thereof. This gap is held to desired dimensions by the side walls on the rim of male wheels which deforms the back portion or web portion of the blanks. Thus, as shown in Figures 9 to 11, the ends of the blank engage these side walls.

The succeeding passes of the machine further deform the blank 11 in successive stages to produce blanks 11g, 11h, 11i and the finished tubular pin 12 as shown in Figures 11 to 15, inclusive. These passes only work the exterior of the blanks, and the male wheel does not have a mandrel rim working the inner face of the bowed web portion of the blank. However, in each instance, a rim rib is provided on the male wheel to project into the tubular blank for preventing its rotation out of proper alignment.

Figure 12:
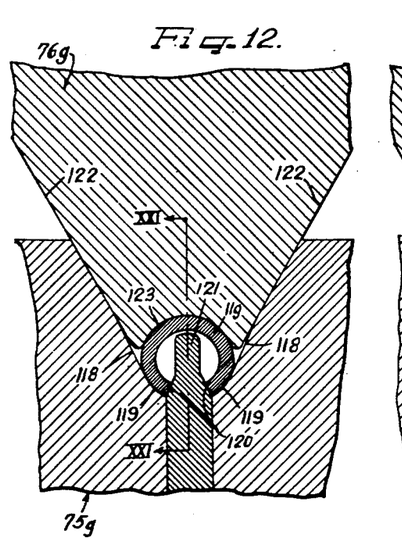
Figure 21:
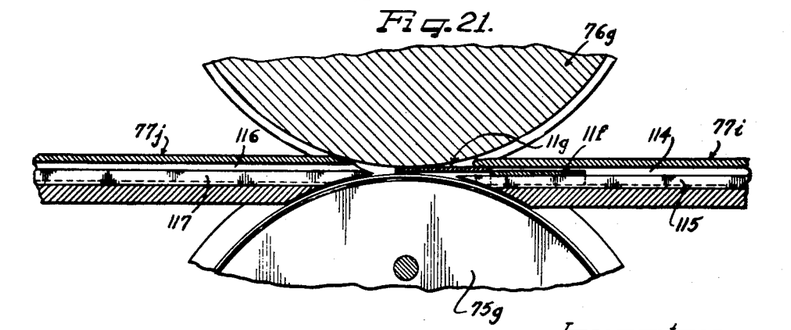
Figure 21 is a view similar to Figures 16 and 20 taken along the line XXI—XXI of Figure 12.

As shown in Figure 21, the guide fingers 77i and 77j coacting with the wheels 75g and 76g of the next pass shown in Figure 12, exemplify the type of guide fingers that are used in all of the passes which close the gap of the tubular blank 11f from the pass illustrated in Figure 11. Thus, the guide finger 77i has a groove 114 with a rib 115 extending throughout its length. The blank 11f from the pass shown in Figure 11 is fed through the groove 114 in straddling relation around the rib 115 into the nip between the wheels 75g and 76g whereupon it is raised to the top of the groove 114 to start to form the blank 11g. This blank 11g then enters the groove 116 of the finger 77j and has its leading end straddling the rib 117 in this groove 116 before its trailing end leaves the rib 115.

As best shown in Figure 12, the bottom wheel 75g has a tapered recess defined by converging side walls 118 which extend inwardly into the wheel to curved bottom walls 119. These walls 119 extend inwardly to outturned sloping shoulders 120 forming abutments for the ends of blank as will be more fully explained. A rib 121 projects radially outward from the converging ends of the shoulders 120 for a distance which is less than the internal diameter of the blank 11g so that the rib will not engage the inner wall of the blank.

The top wheel 76g has converging side walls 122 extending to a substantially semi-circular recess 123 around the periphery of the wheel. The blank 11g is formed by the wall 123 forcing the blank against the curved converging walls 119 until the ends of the blank engage the shoulders 120. The rib 121 cooperates with ribs 115 and 117 of the guide fingers to guide the blank through the nip and prevent its rotation.

Figure 13:
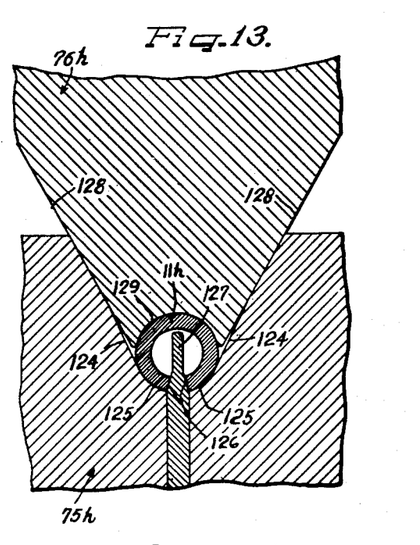

The next pass shown in Figure 13 includes a bottom wheel 75h which has a recess with converging side walls 124 and with more pronounced curved ends 125 extending to shoulders 126 which are closer together than the shoulders 120 and have less taper than the shoulders 120. A rib 127 extends upwardly from the center of the recess beyond the shoulders 126. The top wheel has the converging side walls 128 fitting into the recess of the bottom roll and converging to a fragmental circular recess 129 which is more of a true circle than the recess 123 of the preceding wheel. A blank 11h is formed from the blank 11g in the same manner described in connection with Figure 12.

Figure 14:
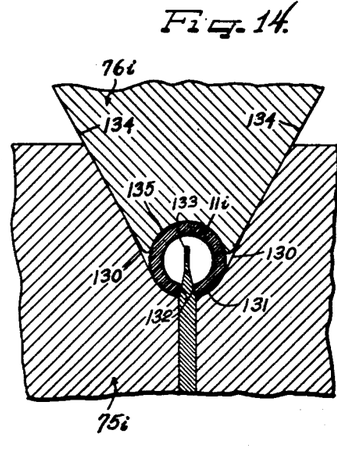

In Figure 14, the bottom wheel 75i has a recess with the converging side walls 130 and the rounded bottom walls 131 together with the shoulders 132 which are closer together than the shoulders 126 and have less taper than these shoulders. The rib 133 extending from the shoulders 132 is quite thin. The top wheel has the converging side walls 134 with a substantially true semi-circular recess 135 and a blank 11i is formed from the blank 11h to produce substantially the finished roll pin shape.

Figure 15:
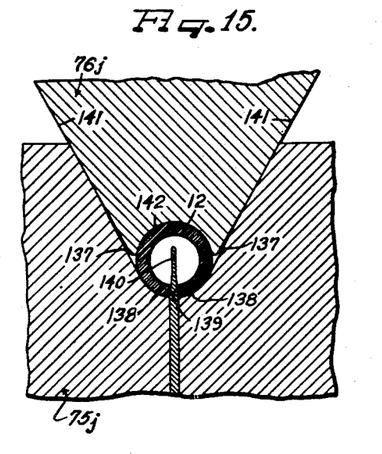

In the final pass, illustrated in Figure 15, the bottom wheel 75j has the side walls 137 converging to true circular arc portions 138 on opposite sides of slightly tapered shoulders 139 which are quite close together and have a very thin rib 140 extending upwardly therefrom. The top wheel has the side walls 141 converging to a true fragmental circular recess 142. The wheels 75j and 76j thus cooperate to deform the blank 11i to the final tubular pin 12.

It will be appreciated that in each of the passes shown in Figures 12 to 15 the blanks are successively worked from their outsides to produce the true circular contour of the finished tubular pin. In each pass, the size of the gap in the blank is accurately controlled by anvil surfaces on the bottom wheel and these surfaces are tapered to control the planes of the ends of the blank.

After passage through the nip of the last rolls 75g and 76g, the finished tubular pins are discharged to a collecting bin through a chute 143.

From the above descriptions, it will be understood that this invention provides a very efficient method for making tubular pins especially useful as spring dowel pins.

According to the method, flat metal stock such as spring steel strip stock is successively cut into slugs which are fed in end to end relation through a number of passes of forming rolls or wheels which successively deform the slugs to produce the final tubular pin in operations which are accurately gauged and uniformly reproduced on each successive blank. The slugs and blanks are advanced in guide fingers which hold them in proper end to end relationship, and the forming rolls or wheels cause the advancement of the blanks. The wheel speeds are controlled so that jamming cannot occur. The guides are arranged to introduce the work to the passes at one level and to receive the work from the passes at another level before the trailing edge of the blanks leave the incoming guides. In this manner, the stock cannot be bent to follow the tubes, and very short pieces can be handled without danger of longitudinal deformation.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. The method of forming relatively short tubular pins without deforming the pins along their length which comprises successively cutting the leading end of a metal strip having a width desired for the tubular pin to form cut off portions from immediately adjacent segments of the strip and without loss of metal between the portions, gauging the length of the cut-off portion in accordance with the desired circumference dimension for the tubular pin, feeding the thus cut-off portions in end to end relation transversely of the strip, progressively working the cut-off portions of the strip in its direction of feeding movement with a rolling action, and supporting the metal pieces and blanks formed therefrom along their lengths during the rolling deformation thereof to hold the blanks against longitudinal deformation and to prevent the blanks from following the contour of the rolls and thereby produce a straight tubular pin having a length determined by the width of the strip and a circumference determined by the cut-off length of the strip.

2. The method of making resiliently contractable longitudinally slotted tubular pins which comprises chamfering the sides of a metal strip, successively cutting the leading end portion of said strip to form, from immediately adjacent portions of the strip, rectangular slugs having lengths determined by the width of the strip and widths determined by the cut-off lengths of the leading end portions of the strip, said slugs having chamfered ends provided by the sides of the strip, advancing the slugs in end to end relation, progressively rolling the advancing slugs transversely of the length thereof into tubular form with the chamfered edges on the ends of the slugs facing outwardly, holding the slugs against longitudinal deformation during said rolling thereof, and pressing the juxtaposed sides of the rolled tubular slugs against a spacer to gauge the width of a gap between the sides for producing slotted radially contractable tubular pins having tapered ends facilitating insertion in holes and the like receptacles.

3. In the method of making relatively short tubular pins, the steps which comprise forming flat metal blanks having lengths desired for the length of the finished tubular pins and widths equivalent to the circumferential dimensions desired for the finished tubular pins, advancing the blanks longitudinally in end to end relation, progressively bending each blank in succession inwardly from both sides thereof to form tubular shapes therefrom, supporting each blank during bending to maintain the end to end relation while holding the blank against longitudinal bending and successively forcing the side edges of the advancing bent blanks against spaced abutments to provide a gauged cleft gap extending along the length of the tubular shapes.

4. The method of making tubular pins which comprises providing rectangular metal slugs having lengths equivalent to the desired tubular pin lengths and widths equivalent to the desired tubular pin circumference dimension, advancing the slugs longitudinally in end to end relation along a confined path, bending the advancing slugs along their side edges to provide channeled blanks, supporting the channeled blanks to maintain the end to end relation, bending the web portions of the channeled blanks into bowed configurations to bring the side portions toward each other, squeezing the outside of the resulting bowed blanks into substantially circular configuration, simultaneously holding the side edges of the bowed blanks in predetermined spaced relation, and confining substantially the entire lengths of the blanks during said bending operations to prevent longitudinal bending of the blanks.

5. The method of forming spring tubular pins which comprises simultaneously deforming successive length increments of the side margins of a flat rectangular spring metal slug to produce a channeled member having a flat web portion and arcuately curved side flanges, longitudinally advancing the channeled member, successively deforming successive length increments of the flat web portion of the longitudinally advancing channeled member into an arcuate configuration to produce a C-shaped blank, longitudinally advancing the C-shaped blank, successively squeezing successive length increments of the outer wall of the longitudinally advancing C-shaped blank into tubular shape while forcing the side edges of the blank against abutments to control the width of the gap along the length of the tubular member, and supporting substantially the entire length of the slug during the deforming and squeezing operations.

References Cited in the file of this patent

UNITED STATES PATENTS

| | | |
|---|---|---|
| 351,987 | Lewis | Nov. 2, 1886 |
| 1,229,480 | Lane | June 12, 1917 |
| 1,360,241 | Muller | Nov. 23, 1920 |
| 1,924,230 | Davis | Aug. 29, 1933 |
| 2,098,989 | Yoder | Nov. 16, 1937 |
| 2,582,062 | Peters | Jan. 8, 1952 |